United States Patent
Schneider et al.

(10) Patent No.: US 7,340,968 B2
(45) Date of Patent: Mar. 11, 2008

(54) BACK EMF MEASUREMENT TO OVERCOME THE EFFECTS OF MOTOR TEMPERATURE CHANGE

(75) Inventors: Harvey Schneider, Southbury, CT (US); David Michael Carson, Newtown, CT (US)

(73) Assignee: Thermo Fisher Scientific (Asheville) LLC, Asheville, NC (US)

( * ) Notice: Subject to any disclaimer, the term of this patent is extended or adjusted under 35 U.S.C. 154(b) by 576 days.

(21) Appl. No.: 10/442,093

(22) Filed: May 21, 2003
(Under 37 CFR 1.47)

(65) Prior Publication Data

US 2006/0117875 A1   Jun. 8, 2006

Related U.S. Application Data

(60) Provisional application No. 60/381,824, filed on May 21, 2002.

(51) Int. Cl.
   *G01L 3/00* (2006.01)
(52) U.S. Cl. .................................................. 73/862.08
(58) Field of Classification Search ............. 73/862.08
   See application file for complete search history.

(56) References Cited

U.S. PATENT DOCUMENTS

| | | | | |
|---|---|---|---|---|
| 4,267,735 A | * | 5/1981 | Valles et al. | 74/5.7 |
| 4,275,343 A | * | 6/1981 | Fulton et al. | 318/721 |
| 4,876,491 A | * | 10/1989 | Squires et al. | 318/138 |
| 5,099,182 A | * | 3/1992 | Isaacson et al. | 318/254 |
| 6,018,225 A | * | 1/2000 | Garces | 318/798 |
| 6,046,554 A | * | 4/2000 | Becerra | 318/254 |
| 6,448,738 B1 | * | 9/2002 | Burton et al. | 318/807 |
| 6,459,230 B1 | * | 10/2002 | Tao | 318/798 |
| 6,566,829 B1 | * | 5/2003 | Naidu et al. | 318/432 |
| 6,747,427 B1 | * | 6/2004 | Carson | 318/432 |
| 6,906,487 B2 | * | 6/2005 | de Frutos | 318/468 |
| 7,055,368 B2 | * | 6/2006 | Schneider et al. | 73/1.87 |

* cited by examiner

*Primary Examiner*—Edward Lefkowitz
*Assistant Examiner*—Octavia Davis
(74) *Attorney, Agent, or Firm*—Baker & Hostetler LLP

(57) ABSTRACT

A motor torque measurement system includes a motor in communication with a gyro, a centrifuge rotor connected to the gyro, a housing surrounding the rotor and motor, and a controller in communication with the motor. The controller is connected to a back EMF measurement device, which measures the back EMF of the motor, and is also configured to measure motor rotational speed. The back EMF coefficient ($K_e$) and motor torque constant ($K_t$) can be calculated therefrom and the actual motor performance thereby determined. Motor magnet temperature may also be calculated. Back EMF and motor rotational speed measurements may be taken with the motor coasting.

20 Claims, 2 Drawing Sheets

BACK EMF MEASUREMENT TO OVERCOME THE EFFECTS OF MOTOR TEMPERATURE CHANGE

PRIORITY

This application claims priority to the provisional U.S. patent application entitled BACK EMF MEASUREMENT TO OVERCOME THE EFFECTS OF MOTOR TEMPERATURE CHANGE, filed May 21, 2002, having a Ser. No. 60/381,824, the disclosure of which is hereby incorporated by reference.

FIELD OF THE INVENTION

The present invention relates generally to back EMF measurements as related to motor temperature. The invention specifically relates to brushless DC or permanent magnet motors, but can be used to measure the change in a motor constant on any type of motor affected by a rise in motor temperature. More particularly, the present invention relates to centrifuge motors and the measurement of the back EMF coefficient, or (Ke, volts/rpm) to overcome the effects of motor temperature changes.

BACKGROUND OF THE INVENTION

A centrifuge instrument is a device by which liquid samples may be subjected to centrifugal forces. The sample is carried within a member known as a centrifuge rotor. The rotor is mounted to a rotatable drive shaft that is connected to a source of motive energy.

Centrifuges currently employed in laboratories are generally operated by manual controls using various settings and procedures. A rotor control may be used to set the centrifuge to a specific sized or type of rotor. A temperature control and timer are also frequently used depending on the type of sample being tested. There are conventional power switches to manually turn the units on or off as needed. A physical key lock is commonly used to secure centrifuge access from operation. The change in Ke or back EMF, results in a change in the torque produced by the motor. This change in the Ke is caused by an increase in the motor temperature. This makes it difficult to accurately estimate the energy added to the rotor.

The present invention overcomes the prior art problems by measuring the back EMF and RPM simultaneously and calculating the Ke of the motor.

SUMMARY OF THE INVENTION

The foregoing needs are met, to a great extent, by the present invention, wherein in one aspect an apparatus is provided that in some embodiments utilizes a back EMF measurement to overcome the effects of motor temperature change.

In accordance with one aspect of the present invention, a centrifuge motor torque measuring system is provided, comprising a motor in communication with a gyro; a centrifuge rotor connected to the gyro; a housing surrounding the centrifuge rotor and the motor; a controller in communication with said motor, wherein the controller is connected to a back EMF measurement device and the back EMF measurement device comprises at least two taps across motor phase pairs which measures a voltage across the phase pairs.

In accordance with another aspect of the present invention, a method of measuring the back EMF of a motor is provided, comprising the steps of running a motor to a set speed; removing drive power from the motor; measuring the back EMF of the motor; measuring the rotational speed of the motor; and determining the torque output and the temperature coefficient of the motor.

In accordance with yet another aspect of the present invention, a motor torque measurement device is provided, comprising means for running a motor to a set speed; means for removing drive power from the motor; means for measuring the back EMF of the motor; means for measuring the rotational speed of the motor; and means for determining the torque output and the temperature coefficient of the motor, wherein said means for measuring the back EMF of the motor is at least two taps across motor phase pairs which measures a voltage across said phase pairs.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DESCRIPTION OF THE INVENTION

Figure 1:
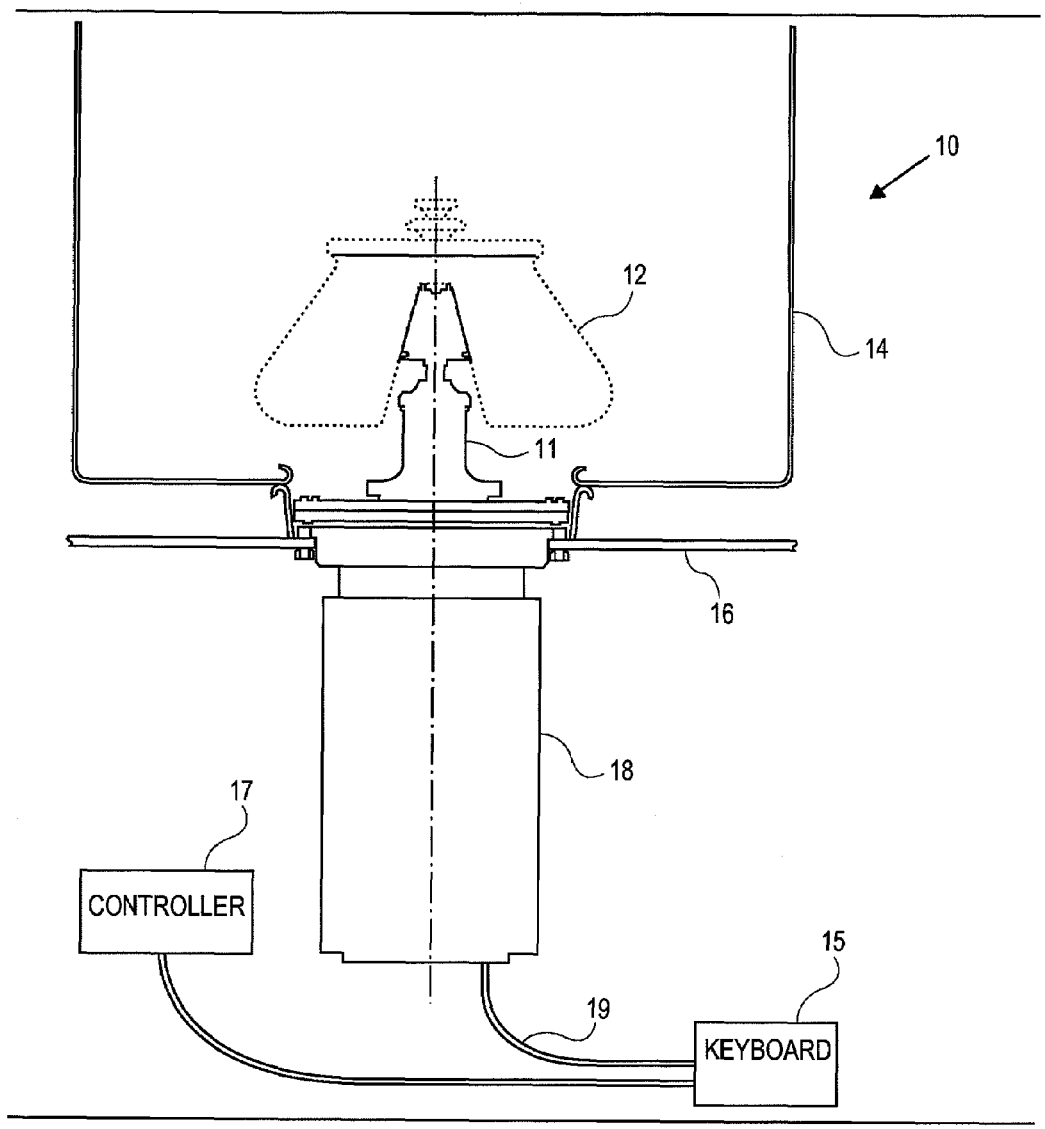
FIG. 1 shows a cross-sectional view of one preferred embodiment of the present invention showing the centrifuge and its components.

Referring to FIG. 1, a preferred embodiment of the invention provides a centrifuge 10 having a gyro/motor rotor 11, a centrifuge rotor 12, an axis of rotation 13, an evaporator 14, a Ke Board/Circuit 15, a centrifuge housing 16, a controller 17, a motor 18 and phase pair motor taps 19.

As the temperature of the motor 18 increases, its back EMF coefficient (Ke) decreases in a known manner determined by its magnet material temperature coefficient. The Ke value is defined as the amount of voltage that a freely rotating motor will generate per 1000 revolutions per minute (RPM). It is not easy to directly measure the temperature of the rotating magnetic material and without knowing the magnet temperature, the change in Ke cannot be directly calculated. By momentarily removing the drive power from the motor 18 and allowing the motor 18 to coast, the back EMF and RPM can be measured simultaneously and the Ke of the motor 18 can be readily be calculated.

Because the mass moment of inertia of the centrifuge rotor is much greater than the mass moment of inertia of the gyro/motor rotor 11, 5 to over 200 times greater in fact, and the back EMF measurement is done within 1 second, the rotational speed of the motor 18 will not significantly decrease.

Figure 2:
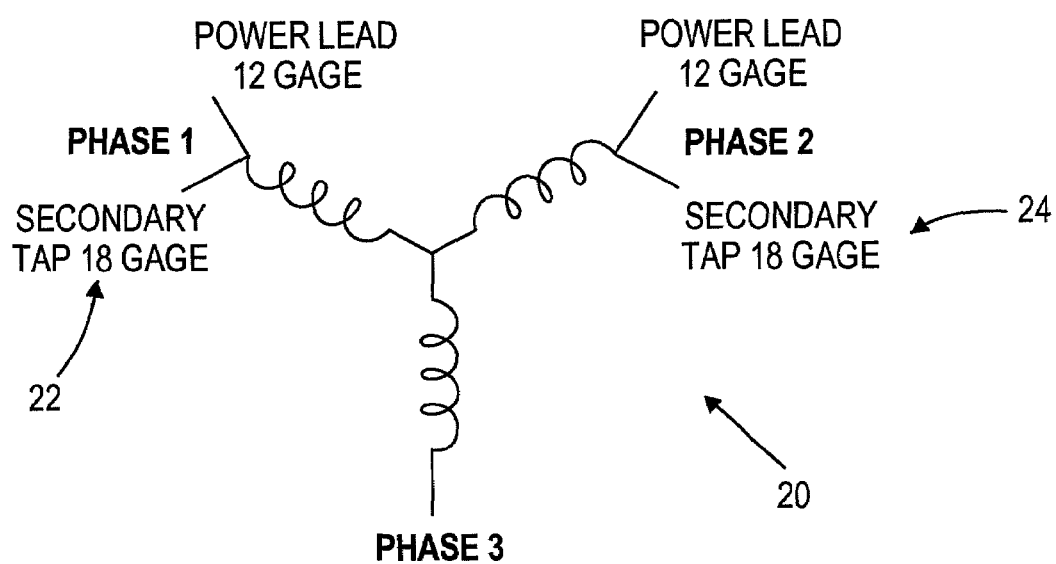
FIG. 2 shows motor phase leads with two tap connections of one preferred embodiment of the present invention.

Referring to FIG. 2, the back EMF value is measured by measuring the voltage across two of the phase pairs or windings 22, 24 of the motor 18. Two taps or leads 22, 24 are either built into the motor 18 or attached at the ends of the phase leads 20.

Referring back to FIG. 1, a special circuit is constructed, called the Ke board 15, which will measure the back EMF voltage across a motor phase pair by means of the two taps 22, 24. During the measurement of the back EMF voltage, the motor rotational speed is also noted by the controller 17. After the controller 17 acquires and stores the back EMF voltage and the speed at which the back EMF measurement was taken, the Ke value can be calculated. The back EMF measurement is an AC voltage. The Ke value is volts per 1000 RPM of rotational speed, therefore:

$$Ke\_AC=(\text{back EMF voltage})/(\text{measurement\_speed}/1000)$$

Normally the root mean square (RMS) value is used in motor calculations:

$$Ke\_AC\_rms=Ke\_AC*(\sqrt{2})/2$$

The motor torque constant (Kt) measured in torque output per amps of current input can then be calculated by the controller 17 using the following formula:

$$Kt\_DC=Ke\_AC\_rms*0.866*\sqrt{2}*0.0845$$

(This value is in inch-pounds of torque per ampere of input current)

Using the above formulas and knowing the input current into the motor 18 the torque output of the motor 18 can be calculated at any time using the following formula:

$$Motor\_Torque=Kt\_DC*Input\_Current$$

Conventionally the Ke and Kt of a motor 18 are determined by using another motor to drive the motor being measured. This technique yields the Ke and Kt of a room temperature motor. It is a characteristic of the permanent magnet material used in motors that the magnetic strength decreases linearly with an increase in magnet temperature, i.e., the torque output of the motor 18 drops as the magnet temperature increases.

For example, the magnetic property of ferrite magnet material decreases 0.2% per degree centigrade rise in temperature. For instance, a rise of 100° C. of the magnet material would result in a 20% loss of motor performance.

Since it is difficult to directly measure the magnet temperature, it is difficult to determine the drop in motor performance. The present invention avoids such a problem, by measuring the actual motor performance, regardless of magnet temperature. The present invention can be used at any point in the operation of the motor 18. The present invention can be used in systems, such as centrifuges, where it is vital to know the torque output of a brushless DC motor. It can also be used with any motor system where the motor torque constant can be derived by knowing the back EMF and speed or RPM.

A secondary advantage of the present invention is that, by knowing the temperature coefficient of the magnetic material, and the percent drop in motor performance, the temperature of the magnetic material can be estimated more accurately.

The many features and advantages of the invention are apparent from the detailed specification, and thus, it is intended by the appended claims to cover all such features and advantages of the invention which fall within the true spirits and cope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A centrifuge motor torque measuring system, comprising:
   a motor having a magnetic material;
   a gyro in communication with the motor;
   a centrifuge rotor connected to said gyro;
   a housing surrounding said centrifuge rotor and said motor; and
   a controller in communication with said motor,
   wherein said controller is connected to a back EMF measurement device and is configured to calculate the temperature of the magnetic material using a temperature coefficient of the magnetic material and a percentage drop in motor performance.

2. The system of claim 1, wherein said back EMF measurement device comprises at least two taps across motor phase pairs which measure a voltage across said phase pairs.

3. The system of claim 2, wherein the back EMF measurement is an AC voltage.

4. The system of claim 3, wherein the controller is configured to measure the motor rotational speed.

5. The system of claim 4, wherein the controller is configured to calculate a motor torque constant.

6. The system of claim 5, wherein the controller is configured to calculate the torque output of the motor using said motor torque constant and an input current into the motor.

7. A method of overcoming effects of motor temperature change of a motor having a magnetic material, comprising:
   running the motor to a set speed;
   removing drive power from the motor;
   measuring the back EMF of the motor;
   measuring the rotational speed of the motor;
   determining the torque output of the motor; and
   determining the temperature of the magnetic material using a temperature coefficient of the magnetic material and a percentage drop in motor performance.

8. The method of claim 7, wherein the measuring steps are performed simultaneously by a controller.

9. The method of claim 8, wherein said controller comprises a back EMF measurement device.

10. The method of claim 9, wherein said controller records the motor rotational speed.

11. The method of claim 10, wherein said controller calculates a motor torque constant.

12. The method of claim 11, wherein the controller calculates the torque output of the motor using said motor torque constant and an input current into the motor.

13. The method of claim 9, wherein said back EMF measurement device comprises at least two taps across motor phase pairs which measure a voltage across said phase pairs.

14. The method of claim 13, wherein the back EMF measurement is an AC voltage.

15. A motor torque measurement device, comprising:
- means for running a motor having a magnetic material to a set speed;
- means for removing drive power from the motor;
- means for measuring the back EMF of the motor;
- means for measuring the rotational speed of the motor;
- means for determining the torque output of the motor; and
- means for determining the temperature of the magnetic material using a temperature coefficient of the magnetic material and a percentage drop in motor performance.

16. The device of claim 15, wherein said means for measuring the back EMF of the motor is at least two taps across motor phase pairs which measure a voltage across said phase pairs.

17. The device of claim 15, wherein said means for determining the torque output and means for determining the temperature of the magnetic material include a controller.

18. The device of claim 17, wherein said controller is configured to calculate a motor torque constant.

19. The device of claim 18, wherein said controller is configured to calculate the torque output of the motor using said motor torque constant and an input current into the motor.

20. The device of claim 16, wherein the back EMF measurement is an AC voltage.

* * * * *